(12) United States Patent
Georgin et al.

(10) Patent No.: US 10,106,139 B2
(45) Date of Patent: Oct. 23, 2018

(54) BRAKE SYSTEMS AND METHODS

(71) Applicant: GOODRICH CORPORATION, Charlotte, NC (US)

(72) Inventors: Marc Georgin, Dayton, OH (US); Eric Daniel Cahill, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 21 days.

(21) Appl. No.: 15/423,282

(22) Filed: Feb. 2, 2017

(65) Prior Publication Data

US 2018/0215370 A1 Aug. 2, 2018

(51) Int. Cl.
| | |
|---|---|
| *F16D 65/82* | (2006.01) |
| *B60T 15/04* | (2006.01) |
| *F16D 65/12* | (2006.01) |
| *F16D 65/18* | (2006.01) |
| *B64C 25/44* | (2006.01) |
| *B60T 7/08* | (2006.01) |
| *F16D 121/04* | (2012.01) |
| *F16D 121/26* | (2012.01) |
| *F16D 65/02* | (2006.01) |
| *F16D 55/24* | (2006.01) |

(52) U.S. Cl.
CPC ............ *B60T 15/041* (2013.01); *B60T 7/085* (2013.01); *B64C 25/44* (2013.01); *F16D 65/12* (2013.01); *F16D 65/186* (2013.01); *F16D 55/24* (2013.01); *F16D 2065/1324* (2013.01); *F16D 2121/04* (2013.01); *F16D 2121/26* (2013.01); *F16D 2200/0039* (2013.01); *F16D 2200/0052* (2013.01)

(58) Field of Classification Search
CPC ......... B64C 25/44; B64C 25/36; B64C 27/12; B60T 15/041; B60T 7/085; F16D 65/12; F16D 65/186; F16D 2121/04; F16D 2121/26; F16D 2065/1324; F16D 2200/0039; F16D 2200/0052; F16D 55/24
USPC .......... 244/110 H; 74/500.5, 501.5 H, 501.6, 74/502–504
See application file for complete search history.

(56) References Cited

U.S. PATENT DOCUMENTS

| | | | |
|---|---|---|---|
| 2,893,206 A | * | 7/1959 | Gelb ....................... B60T 11/10 188/152 |
| 4,926,099 A | | 5/1990 | Ricker |

(Continued)

FOREIGN PATENT DOCUMENTS

CN 20101043 1/2008

OTHER PUBLICATIONS

EP Search Report dated Jun. 22, 2018 in EP Application No. 18153001.5-1012.

*Primary Examiner* — Pamela Rodriguez
(74) *Attorney, Agent, or Firm* — Snell & Wilmer, L.L.P.

(57) ABSTRACT

A hydraulic brake valve system may comprise a valve housing comprising a brake port, a pressure port, a return port, and a valve actuation end; a valve shaft coupled to the valve actuation end, wherein the valve shaft may be comprised at least partially within the valve housing; and an electric actuator coupled to the valve shaft, wherein the electric actuator may be configured to move the valve shaft between a shaft on position and a shaft off position. The hydraulic brake valve system may be configured to pass hydraulic pressure through at least one of the brake port, the pressure port, or the return port in response to a position of the valve shaft.

20 Claims, 9 Drawing Sheets

(56) References Cited

U.S. PATENT DOCUMENTS

| | | |
|---|---|---|
| 5,366,281 A | 11/1994 | Littlejohn |
| 6,139,460 A | 10/2000 | Drennen |
| 6,366,280 B1 | 4/2002 | Allen et al. |
| 6,367,593 B1 | 4/2002 | Siler |
| 6,390,247 B1 | 5/2002 | Drennen |
| 6,401,879 B1 | 6/2002 | Drennen |
| 6,422,659 B2 | 7/2002 | Disser |
| 6,435,320 B1 | 8/2002 | Drennen |
| 6,511,135 B2 | 1/2003 | Ballinger |
| 6,527,091 B2 | 3/2003 | Klode |
| 6,561,321 B1 | 5/2003 | Klode |
| 6,626,270 B2 | 9/2003 | Drennen |
| 6,668,983 B2 | 12/2003 | Drennen |
| 6,679,356 B2 | 1/2004 | Hageman |
| 6,703,740 B2 | 3/2004 | Klode |
| 6,709,073 B2 | 3/2004 | Riddiford |
| 6,803,773 B1 | 10/2004 | Cyran |
| 6,813,970 B2 | 11/2004 | Siler |
| 6,851,765 B1 | 2/2005 | Disser |
| 6,913,327 B2 | 7/2005 | Thomas |
| 6,931,940 B2 | 8/2005 | Baudendistel |
| 6,942,072 B2 | 9/2005 | Klode |
| 6,959,969 B2 | 11/2005 | Simpson |
| 6,972,560 B2 | 12/2005 | Baudendistel |
| 6,975,087 B1 | 12/2005 | Crabill |
| 7,018,001 B2 | 3/2006 | Riddiford |
| 7,042,189 B2 | 5/2006 | Hossain |
| 7,095,206 B2 | 8/2006 | Lequesne |
| 7,267,206 B2 * | 9/2007 | Dupuis .................. B60T 7/08 188/71.9 |
| 7,267,616 B2 | 9/2007 | Siler |
| 7,347,305 B2 | 3/2008 | Klode |
| 7,374,254 B2 | 5/2008 | Zumberge |
| 7,402,969 B2 | 7/2008 | Disser |
| 7,424,937 B2 | 9/2008 | Henry |
| 7,475,760 B2 | 1/2009 | Longuemare |
| 7,481,054 B2 | 1/2009 | Hageman |
| 7,545,163 B2 | 6/2009 | Disser |
| 7,726,748 B2 | 6/2010 | Zumberge |
| 9,004,614 B1 * | 4/2015 | Elving ................... B64C 27/12 303/71 |
| 9,037,371 B2 | 5/2015 | Cahill |
| 9,140,321 B2 | 9/2015 | Drennen et al. |
| 9,273,738 B2 | 3/2016 | Rehfus et al. |
| 9,297,430 B2 | 3/2016 | Drennen et al. |
| 9,308,990 B2 | 4/2016 | Drennen et al. |
| 9,328,809 B2 | 5/2016 | Rehfus et al. |
| 9,359,069 B2 | 6/2016 | Drennen et al. |
| 9,360,095 B2 | 6/2016 | Drennen et al. |
| 9,463,872 B2 | 10/2016 | Klode |
| 9,464,918 B2 | 10/2016 | Klode et al. |
| 9,482,325 B2 | 11/2016 | Drennen et al. |
| 9,482,326 B2 | 11/2016 | Drennen et al. |
| 9,527,584 B2 | 12/2016 | Rehfus et al. |
| 9,545,903 B2 | 1/2017 | Rehfus et al. |
| 9,548,643 B2 | 1/2017 | Rehfus et al. |
| 9,815,551 B2 * | 11/2017 | Drennen ................ B64C 25/36 |
| 2005/0274580 A1 | 12/2005 | Hageman |
| 2007/0029142 A1 | 2/2007 | Drennen |
| 2007/0068237 A1 | 3/2007 | Zumberge |
| 2007/0074937 A1 | 4/2007 | Longuemare |
| 2007/0205798 A1 | 9/2007 | Disser |
| 2007/0222403 A1 | 9/2007 | Disser |
| 2010/0276988 A1 * | 11/2010 | Cahill .................. B60T 8/1703 303/20 |
| 2011/0018337 A1 | 1/2011 | King et al. |
| 2013/0175403 A1 | 7/2013 | Spray |
| 2014/0014447 A1 * | 1/2014 | O'Connell ............. B64C 25/44 188/151 R |
| 2014/0375179 A1 | 12/2014 | Hinton et al. |
| 2015/0114150 A1 | 4/2015 | Drennen et al. |
| 2015/0115778 A1 | 4/2015 | Drennen et al. |
| 2016/0122009 A1 | 5/2016 | Drennen et al. |
| 2016/0123417 A1 | 5/2016 | Rehfus et al. |
| 2016/0123445 A1 | 5/2016 | Drennen et al. |
| 2016/0126811 A1 | 5/2016 | Klode et al. |
| 2016/0169310 A1 | 6/2016 | Erickson et al. |
| 2016/0207613 A1 | 7/2016 | Drennen et al. |
| 2016/0223415 A1 | 8/2016 | Beason et al. |
| 2016/0305501 A1 | 10/2016 | Rehfus et al. |
| 2017/0023078 A1 | 1/2017 | Rehfus et al. |

* cited by examiner

BRAKE SYSTEMS AND METHODS

FIELD

This disclosure generally relates to brake systems, and more specifically to emergency brake systems.

BACKGROUND

Emergency brake assemblies, or park brake assemblies, are configured to engage the brakes of a vehicle (e.g., an aircraft, automobile, etc.) for an extended period of time. An operator of such a vehicle may be located in an entirely different area than the emergency brake, and therefore, there is often a mechanism to relay the operator's commands to the emergency brake. Additionally, an operator may desire to engage an emergency brake to varying degrees depending on the circumstances.

SUMMARY

In various embodiments, a hydraulic brake valve system may comprise a valve housing comprising a brake port, a pressure port, a return port, and a valve actuation end; a valve shaft coupled to the valve actuation end, wherein the valve shaft may be comprised at least partially within the valve housing; and an electric actuator coupled to the valve shaft, wherein the electric actuator may be configured to move the valve shaft between a shaft on position and a shaft off position. The hydraulic brake valve system may be configured to pass hydraulic pressure through at least one of the brake port, the pressure port, or the return port in response to a position of the valve shaft. In various embodiments, the hydraulic brake valve system may further comprise a valve lever coupled to the valve housing at a fulcrum and coupled to the electric actuator, wherein the valve lever is rotated about the fulcrum by the electric actuator, wherein the valve shaft is coupled to the valve lever, and the valve shaft moves in response the valve lever rotating about the fulcrum. In various embodiments, the hydraulic brake valve system may further comprise a lever base coupled to the valve housing, wherein the valve lever is coupled to the lever base.

In various embodiments, the electric actuator may comprise an actuator shaft coupled to a motor, wherein operation of the motor causes the actuator shaft to move. In various embodiments, the hydraulic brake valve system may further comprise a spring coupled to the valve shaft, the spring having a bias toward returning the valve shaft to the shaft off position. In various embodiments, the electric actuator may comprise an actuator release configured to release the valve shaft from the shaft on position to allow the spring to return the valve shaft to the shaft off position. In various embodiments, the actuator shaft may move at least one of linearly or rotationally in response to operation of the motor. In various embodiments, the hydraulic brake valve system may be configured to pass hydraulic pressure through the brake port in response to the valve shaft being in the shaft on position. In various embodiments, the hydraulic brake valve system may be configured to pass hydraulic pressure through the return port in response to the valve shaft being in the shaft off position.

In various embodiments, an emergency brake system may comprise a brake assembly comprising at least two brake disks; a hydraulically actuated piston to compress the at least two brake disks in response to an actuation of the emergency brake system; and a hydraulic brake valve system fluidly coupled to the hydraulically actuated piston. In various embodiments, the hydraulic brake valve system may comprise a valve housing comprising a brake port, a pressure port, a return port, and a valve actuation end; a valve shaft coupled to the valve actuation end, wherein the valve shaft is comprised at least partially within the valve housing; and an electric actuator coupled to the valve shaft, wherein the electric actuator may be configured to move the valve shaft between a shaft on position and a shaft off position. The hydraulic brake valve system may be configured to pass hydraulic pressure through at least one of the brake port, the pressure port, or the return port in response to a position of the valve shaft.

In various embodiments, the hydraulic brake valve system may further comprise a valve lever coupled to the valve housing at a fulcrum and coupled to the electric actuator, wherein the valve lever may be rotated about the fulcrum by the electric actuator, wherein the valve shaft may be coupled to the valve lever, and the valve shaft may be configured to move in response the valve lever rotating about the fulcrum. In various embodiments, the hydraulic brake valve system may further comprise a lever base coupled to the valve housing, wherein the valve lever is coupled to the lever base. In various embodiments, the electric actuator may comprise an actuator shaft coupled to an actuator motor, wherein operation of the motor causes the actuator shaft to move. In various embodiments, the hydraulic brake valve system may further comprise a spring coupled to the valve shaft, the spring having a bias toward returning the valve shaft to a shaft off position. In various embodiments, the electric actuator may comprise an actuator release configured to release the valve shaft from the shaft on position to allow the spring to return the valve shaft to the shaft off position. In various embodiments, the actuator shaft may move at least one of linearly or rotationally in response to operation of the motor.

In various embodiments, the hydraulic brake valve system may further comprise an actuator handle in electronic communication with the electric actuator, wherein the motor operates in response to the actuator handle being moved. In various embodiments, the hydraulic brake valve system may be configured to pass hydraulic pressure through the brake port in response to the valve shaft being in the shaft on position.

In various embodiments, a method of operating an emergency brake system may comprise receiving a braking command to engage a brake assembly of the emergency brake system in response to an operator moving an actuator handle from a handle off position to a handle on position, wherein the actuator handle is in electronic communication with an electric actuator comprising an electric motor and an actuator shaft coupled to the electric motor; rotating the electric motor in response to the moving the actuator handle to the handle on position; moving the actuator shaft in an actuation direction in response to rotating the electric motor, wherein the actuator shaft may be coupled to a valve shaft of a hydraulic brake valve system; moving the valve shaft from a shaft off position to a shaft on position, causing hydraulic pressure to flow from a brake port of the hydraulic brake valve system to compress at least two brake disks; and engaging the brake assembly. In various embodiments, the method may further comprise receiving a second braking command to disengage the brake assembly in response to the actuator handle moving from a handle on position to the handle off position; rotating the electric motor in response to the moving the actuator handle to the handle off position; moving the actuator shaft in a direction opposite the actuation direction in response to rotating the electric motor; moving the valve shaft from the shaft on position to the shaft off position; and disengaging the brake assembly.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. Elements with the like element numbering throughout the figures are intended to be the same.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
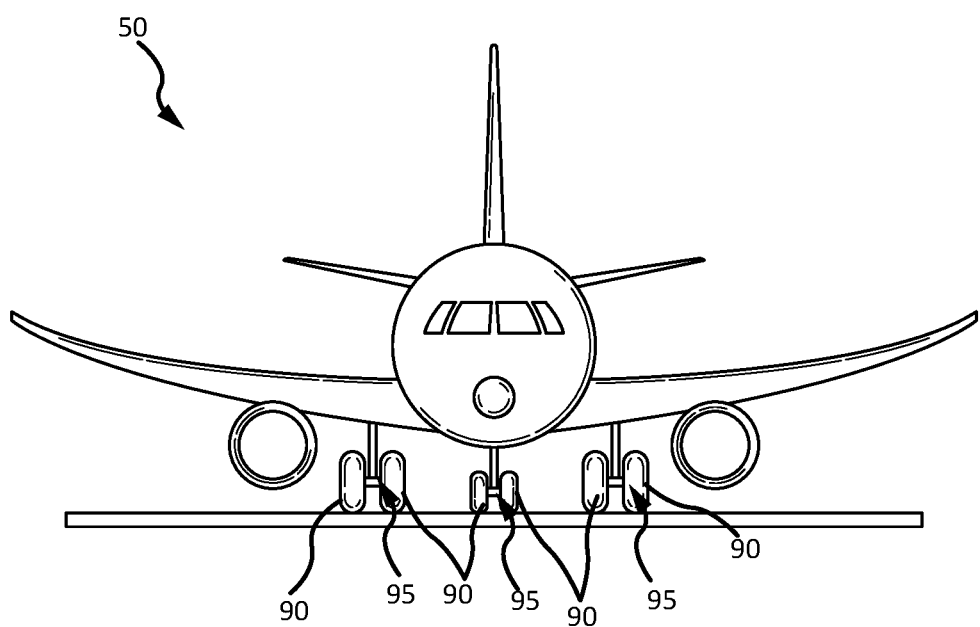
FIG. 1 illustrates a perspective view of an aircraft, in accordance with various embodiments.
Figure 2:
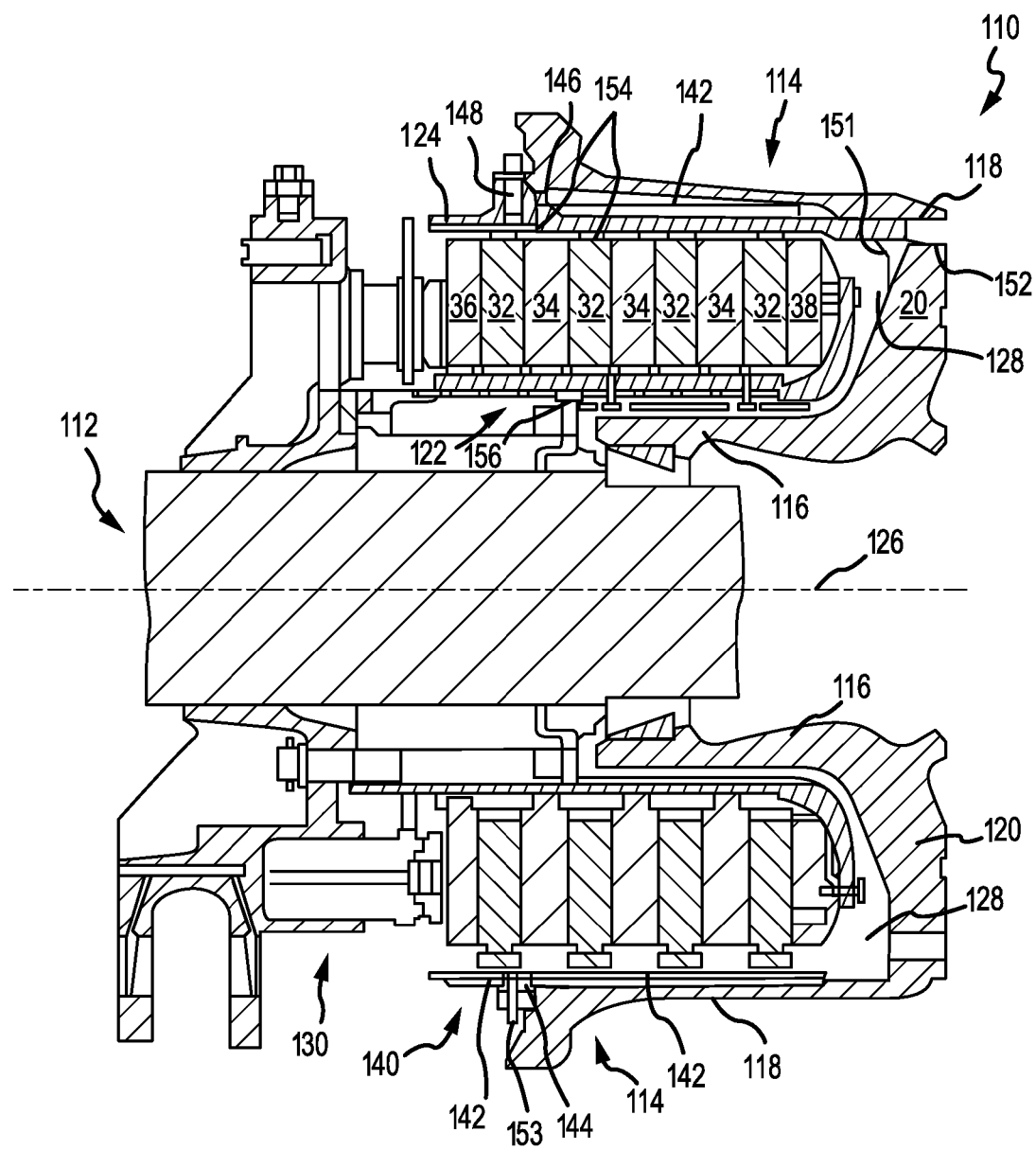
FIG. 2 illustrates a perspective view of a brake assembly, in accordance with various embodiments.

Aircraft, such as aircraft 50 depicted in FIG. 1, may comprise wheels 90 and a brake assembly 95 coupled to each wheel configured to slow, stop, or prevent turning wheels 90. In various embodiments, the same brake assembly may be used for normal braking operation, emergency braking, and/or park braking. In various embodiments, there may be separate brake assemblies for normal braking operation, emergency braking, and/or park braking. Referring to FIG. 2, brake assembly 110 may be found on an aircraft, in accordance with various embodiments. Brake assembly 110 may, for example, comprise a bogie axle 112, a wheel 114 including a hub 116 and a wheel well 118, a web 120, a torque take-out assembly 122, one or more torque bars 124, a wheel rotational axis 126, a wheel well recess 128, an actuator 130, multiple brake rotors 32, multiple brake stators 34, a pressure plate 36, an end plate 38, a heat shield 140, multiple heat shield sections 142, multiple heat shield carriers 144, an air gap 146, multiple torque bar bolts 148, a torque bar pin 151, a wheel web hole 152, multiple heat shield fasteners 153, multiple rotor lugs 154, and multiple stator slots 156.

Brake disks (e.g., interleaved rotors 32 and stators 34) are disposed in wheel well recess 128 of wheel well 118. Rotors 32 are secured to torque bars 124 for rotation with wheel 114, while stators 34 are engaged with torque take-out assembly 122. At least one actuator 130 is operable to compress interleaved rotors 32 and stators 34 for stopping the aircraft. In this example, actuator 130 is shown as a hydraulically actuated piston. Pressure plate 36 and end plate 38 are disposed at opposite ends of the interleaved rotors 32 and stators 34. Rotors 32 and stators 34 can comprise any material suitable for friction disks, including ceramics or carbon materials, such as a carbon/carbon composite.

Through compression of interleaved rotors 32 and stators 34 between pressure plates 36 and end plate 38, the resulting frictional contact slows, stops, and/or prevents rotation of wheel 114. Torque take-out assembly 122 is secured to a stationary portion of the landing gear truck such as a bogie beam or other landing gear strut, such that torque take-out assembly 122 and stators 34 are prevented from rotating during braking of the aircraft.

Figure 3A:
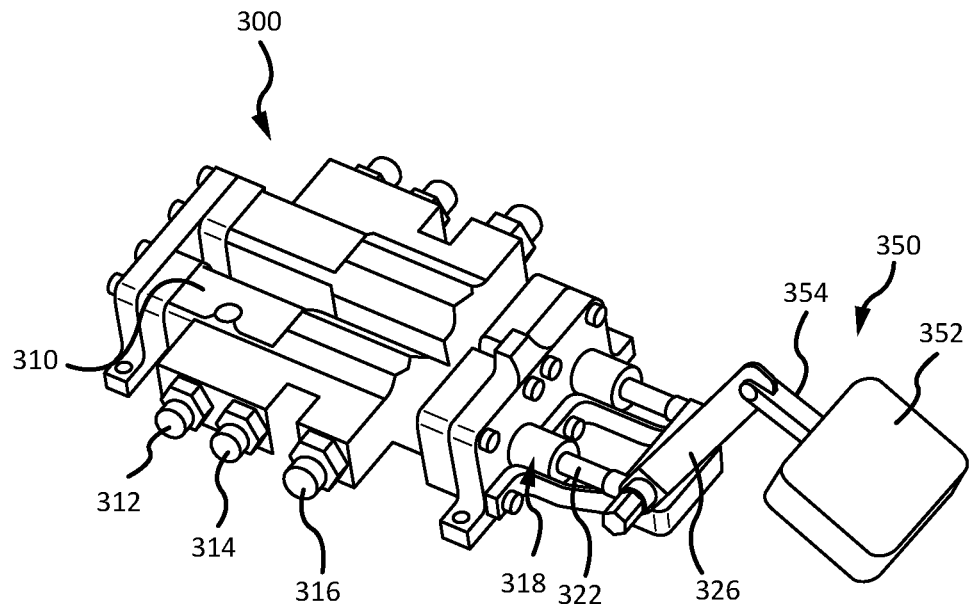
FIGS. 3A and 3B illustrate perspective views of a hydraulic brake valve system, in accordance with various embodiments.
Figure 3B:
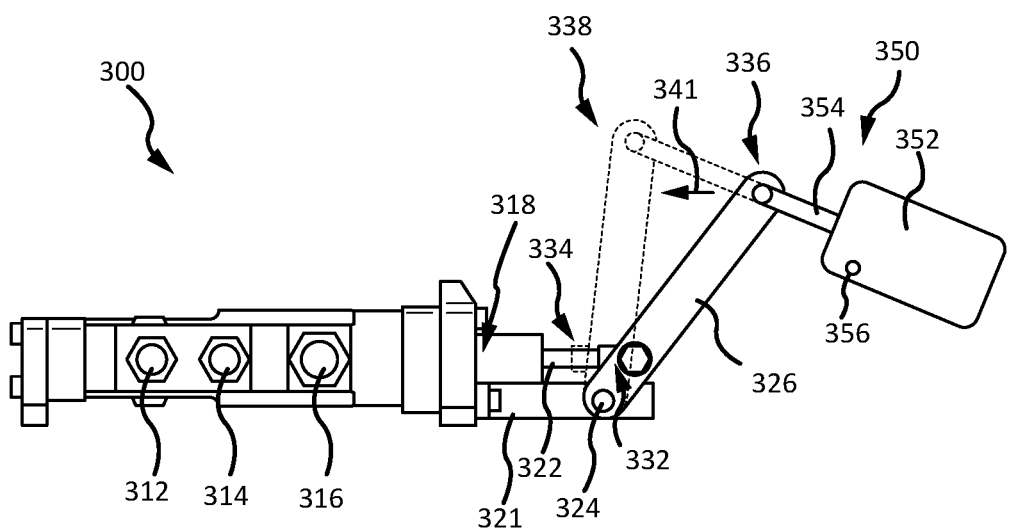
Figure 4:
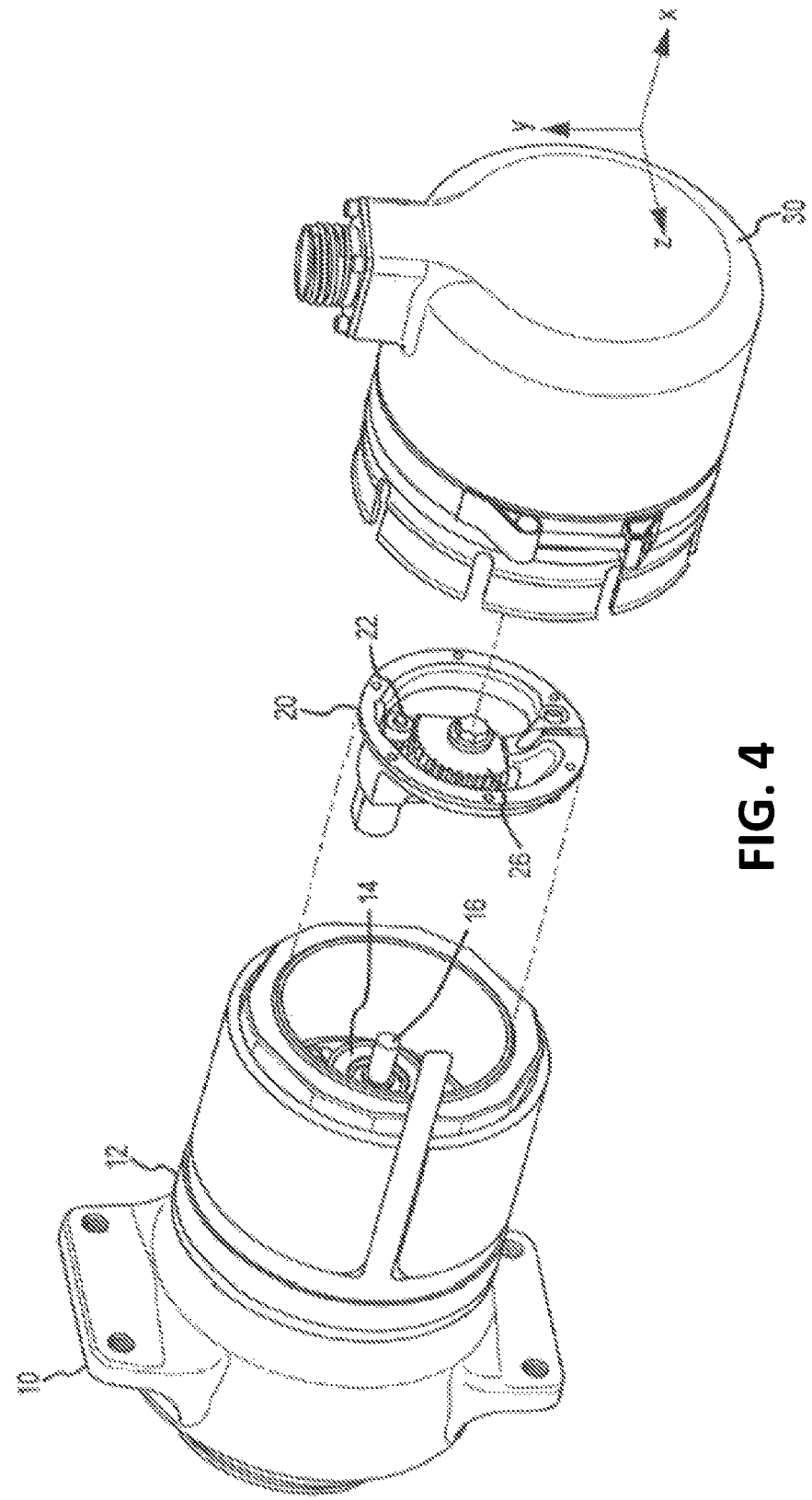
FIG. 4 illustrates an exploded perspective view of an electric motor actuator, in accordance with various embodiments.

In accordance with various embodiments, with reference to FIGS. 3A and 3B, the hydraulic pressure applied to a hydraulically actuated piston (such as actuator 130 in FIG. 2) to activate a brake assembly may be provided by hydraulic brake valve system 300. Hydraulic brake valve system 300 may comprise a valve housing 310 having a brake port 312, a pressure port 314, and/or a return port 316. Valve housing 310 may comprise a valve actuation end 318 to which a valve shaft 322 may be coupled. Valve shaft 322 may be at least partially comprised within valve housing 310, and may be configured to move in and out valve actuation end 318.

In various embodiments, the movement and/or position of valve shaft 322 may determine through which of brake port 312, pressure port 314, and/or return port 316 hydraulic pressure may pass. For example, valve shaft 322 may comprise spools, which when moved with valve shaft 322 may open or close brake port 312, pressure port 314, and/or return port 316. In response to pressure port 314 being open, hydraulic pressure may pass through pressure port 314 and be used upon activation of hydraulic brake valve system 300 to engage a brake to slow, stop, or prevent the rotation of a wheel. In response to brake port 312 being open, hydraulic pressure may pass through brake port 312 to a brake assembly, activating a hydraulically activated piston to engage the brake and slow, stop, or prevent the rotation of a wheel. In response to return port 314 being open, hydraulic pressure may be released from the brake assembly and travel back into the hydraulic brake valve system 300, causing the brake pressure to be released, allowing free rotation of the wheel.

In various embodiments, hydraulic brake valve system 300 may comprise an actuator 350. Actuator 350 may comprise an actuator housing 352, which may comprise a motor within. Actuator 350 may comprise a gear train (within actuator housing 352) and/or an actuator shaft 354 coupled to the motor. In various embodiments, actuator 350 may be an electric actuator (i.e., the motor of actuator 350 may be an electric motor). Actuator shaft 354 may be coupled to valve shaft 322 such that in response to the activation and rotation of the motor of actuator 350, actuator shaft 354 may move, causing valve shaft to move from a shaft off position 332 to a shaft on position 334. Actuator shaft 354 may be a ball screw, for example, moving linearly in response to the motor rotation, or actuator shaft 354 may rotate in response to the motor rotation. In various embodiments, actuator 350 may be any suitable actuator, such as a concentric actuator.

As depicted in FIGS. 4 and 5A-5C, actuator 350 in FIGS. 3A and 3B may be an electric motor actuator (EMA). In various embodiments, and with reference to FIG. 4, EMA 10 may comprise a housing 12 (an example of actuator housing 352 in FIGS. 3A and 3B) and a cover 30. A three dimensional x, y and z axes is shown for reference and to aid in description. Cover 30 may be configured to sleeve over and/or couple to housing 12. EMA 10 may further comprise a park brake assembly 20 that is installable within housing 12. EMA 10 may also comprise a motor 14 (an example of the motor comprised in actuator 350 in FIGS. 3A and 3B) and a motor shaft 16. Park brake assembly 20 may comprise a pinion gear 22 and a sector gear 26. Park brake assembly 20 may couple to or install on motor shaft 16. More specifically, sector gear 26 of park brake assembly 20 may operatively couple to or otherwise attach to sector gear 26.

Figure 5A:
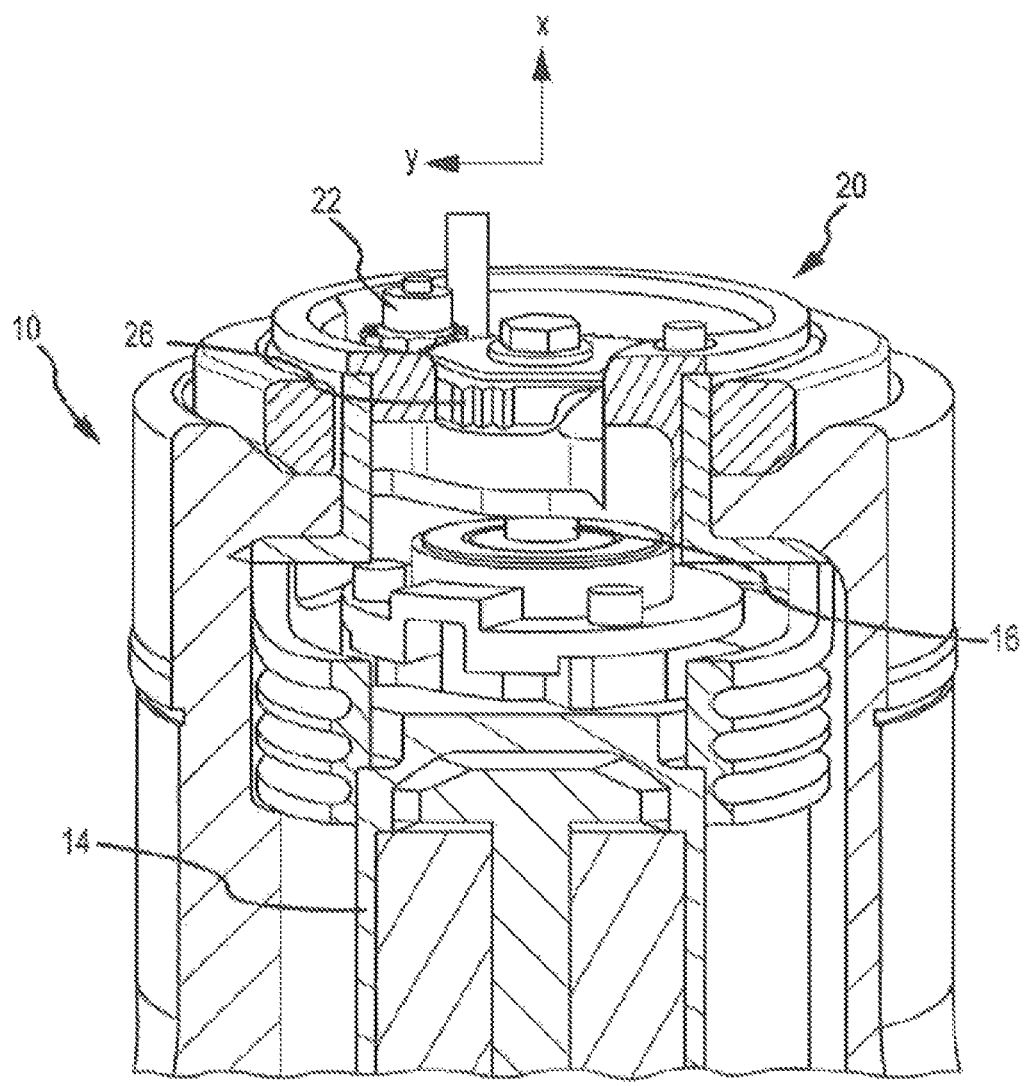
FIGS. 5A-5C illustrate cross-sectional views of a portion of an electric motor actuator, in accordance with various embodiments.
Figure 5B:
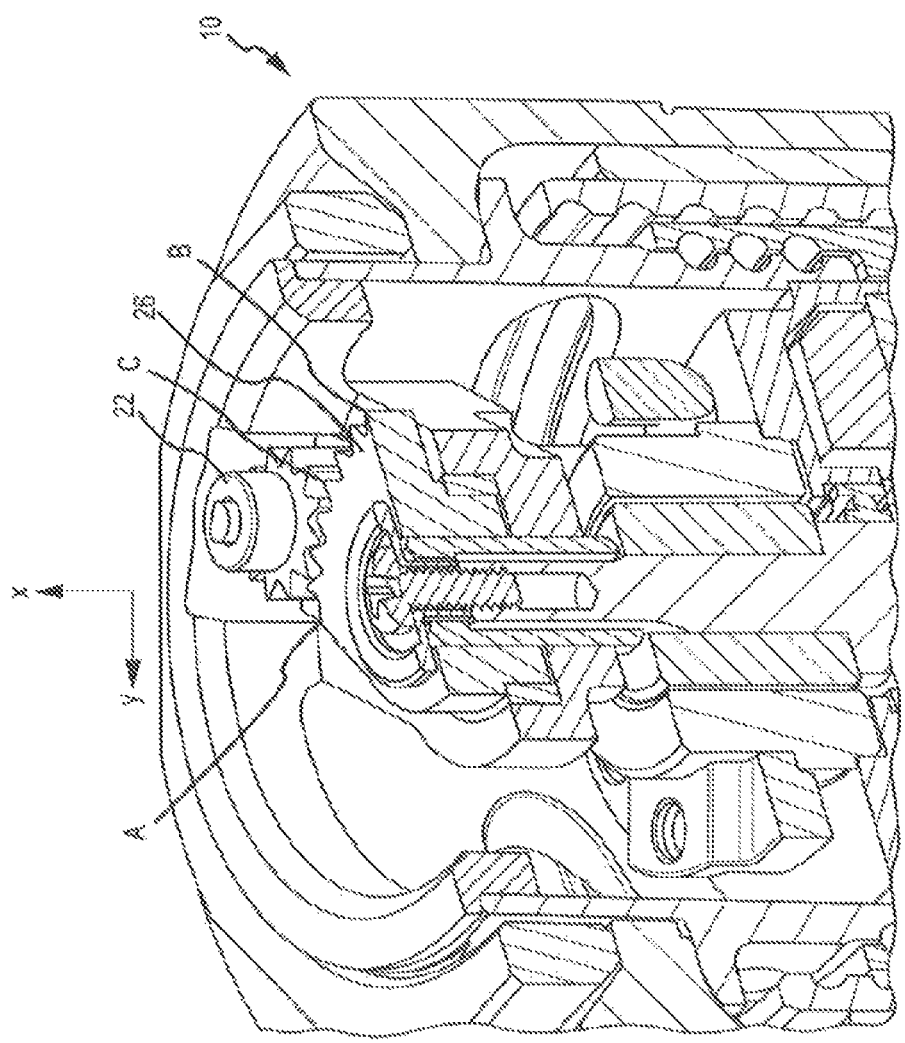
Figure 5C:
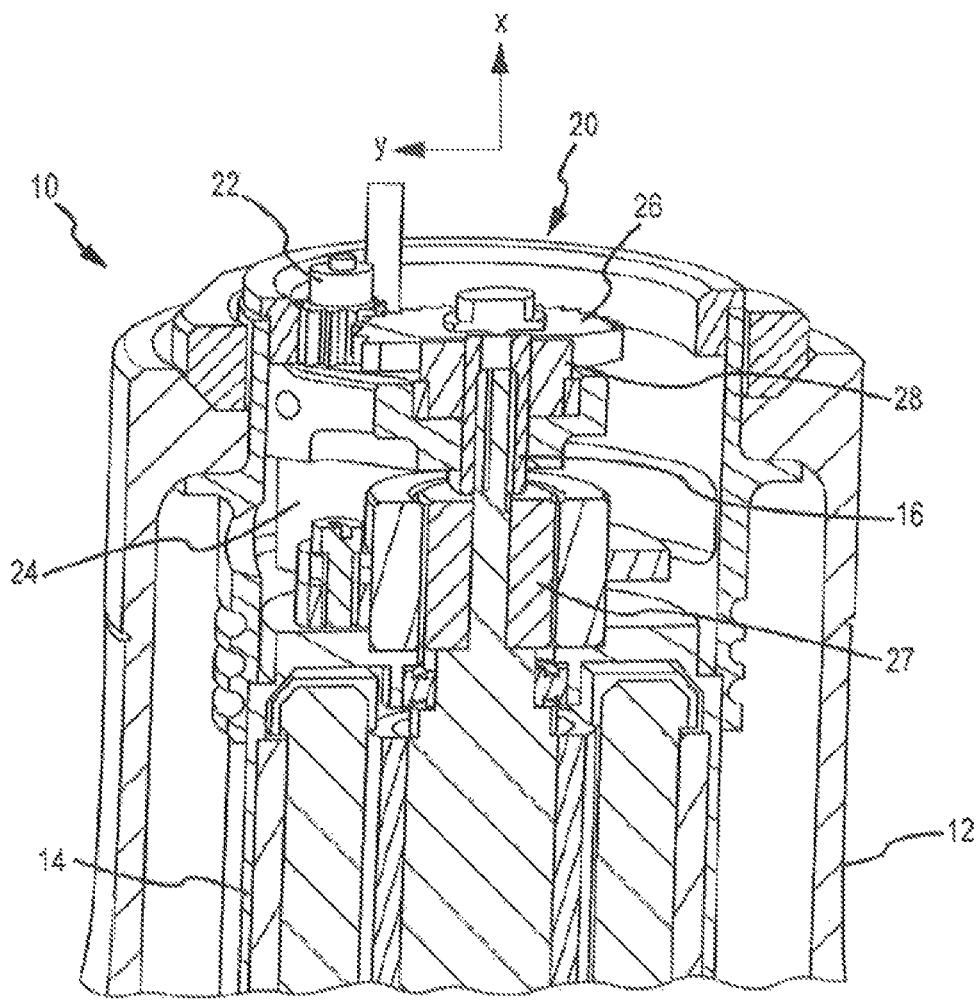

In various embodiments, FIGS. 5A-5C show various cross sectional views of a portion of an EMA 10, where the x and y axes are shown for reference. Motor shaft 16 may be coupled to and/or combined with an electric motor 14. Electric motor 14 may turn and/or drive motor shaft 16. Motor shaft 16 may be coupled to or be integrally formed with a ball screw and/or other suitable ram (the ball screw or other suitable ram being an example of actuator shaft 354 in FIGS. 3A and 3B). In this regard, motor shaft 16 is configured to translate the rotational motion of electric motor 14 to linear motion through the ball screw.

In various embodiments, pinion gear 22 may be configured to engage and/or operatively couple to sector gear 26, as shown in FIG. 5B. Pinion gear 22 may also be configured to drive sector gear 26 under pre-determined or dynamically determined operating conditions. Pinion gear 22 may be coupled to a micro-motor 24, as shown in FIG. 5C.

Motor 24 may be any suitable motor including, for example, a micro-motor. Motor 24 may provide a high mechanical advantage in a relatively small package to fit within a small envelope package of EMA 10. Motor 24 may comprise a gear train (e.g., a micro-gear train within the housing of motor 24). The gear train may have any suitable gear ration, such as a gear ratio of approximately 35:1 to 90:1. The gear train of motor 24 may also engage or be coupled to pinion gear 22. Pinion gear 22 provides an additional gear ratio of approximately 2:1 to 5:1 with respect to sector gear 26.

In various embodiments, sector gear 26 may be any suitable eccentric gear. In this regard, sector gear 26 may have a variable radius. In this regard, sector gear 26 is eccentric to the centerline of the motor shaft 16 (e.g., axis X). More specifically and with particular reference to FIG. 5B, sector gear 26 may be a portion of a gear wheel (e.g., a gear having a pie shape) having a first end A and a second end B. Moreover, the profile defined by the portion of the gear wheel may be non-uniform (e.g., having a first radius associated with first end A and a second radius associated with second end B, where the first radius is shorter than the second radius). In this regard, a profile C of the gear may be non-uniform and/or have a curvature that is a portion of an ellipse, but that would not be a portion of a circle. Moreover, sector gear 26 may comprise teeth over the portion of the non-uniform profile between the first end and the second end.

In various embodiments, EMA 10 may be locked under certain aircraft operating conditions (e.g., pre-determined operating conditions and/or dynamically determined operating conditions). In response to a command or condition to lock EMA 10, park brake assembly 20 may be engaged. For example, with reference to FIG. 5C, motor 24 may drive pinion gear 22 causing sector gear 26 to rotate along its non-uniform profile. The eccentric shape of sector gear 26 may act like a cam that creates a bind on the motor shaft 16. In this regard, as pinion gear 22 rotates the sector gear 26 between the first radius and the second radius, the body of sector gear 26 exerts a radial force (e.g., a force perpendicular to the X-axis) on motor shaft 16. This may cause motor shaft 16 to push into and/or bind on an internal structure of EMA 10 such as, for example, a shaft support 27 and/or an eccentric bushing 28.

In various embodiments, with reference again to FIGS. 3A and 3B, actuator shaft 354 may be directly coupled to valve shaft 322, or coupled by another linking component. In various embodiments, a valve lever 326 may be coupled to valve housing 310 at a first end of valve lever 326 at a fulcrum 324, and at a second end, valve lever may be coupled to actuator shaft 354. Valve shaft 322 may be coupled to valve lever 326 between the first end and second end of valve lever 326. In various embodiments, valve lever 326 may be coupled to a lever base 321 (i.e., fulcrum 324 may be disposed on lever base 321) coupled to valve housing 310. In embodiments in which hydraulic brake valve system 300 comprises valve lever 326, valve lever 326 may be in lever off position 336, and valve shaft 322 may be in shaft off position 332. An "off position" (e.g., lever off position 336, shaft off position 332, and/or handle off position 404, explained in connection with FIG. 6) may be a position in which no hydraulic pressure is applied to a brake assembly (such as brake assembly 10 in FIG. 2), and therefore, there is no braking on the wheel. Actuator 350 may be commanded to apply the brake, and therefore move actuator shaft 354 in a linear and/or rotational direction (for example, actuation direction 341), thus moving valve lever 326 in actuation direction 341. Valve lever 326 may move to an "on position," such as lever on position 338, and in response, valve shaft 322 may move to an "on position," such as shaft on position 334. An "on position" as used herein, (e.g., lever on position 338, shaft on position 334, and/or handle on position 402, explained in connection with FIG. 6) may be any position other than an off position, such that hydraulic pressure may flow from brake port 312 to a brake assembly (such as brake assembly 10 in FIG. 2) to engage the brake. Lever on position 338, shaft on position 334, and/or handle on position 402 (FIG. 6) may be a position of maximum deflection (i.e., maximum on position), in which the maximum hydraulic pressure is applied to a brake assembly, or may be a partially on position in which less than the maximum hydraulic pressure is applied to a brake assembly. In other words, an on position, such as lever on position 338, shaft on position 334, and/or handle on position 402, may be a maximum on position, or anywhere between the off position and the maximum on position. It should be appreciated that actuator shaft 354 may act directly upon valve shaft 322, in which case actuator shaft 354 may move or translate valve shaft 322 from shaft off position 332 to shaft on position 334.

Activating actuator 350 and causing valve shaft 322 to move from shaft off position 332 to shaft on position 334 (whether or not by valve lever 326) may cause hydraulic pressure to flow to a brake assembly to engage a brake, make a wheel slow, stop, or remain immobile. In response to the desired on position being reached, actuator shaft 354 may be locked in place to hold valve shaft 322 and/or valve lever 326 in place to maintain the desired hydraulic pressure applied to the brake. Therefore, actuator 350 may not be powered any longer, and hydraulic brake valve system 300 may still maintain the desired pressure to the brake (which may experience pressure leakage).

In various embodiments, to release a brake on a wheel by using hydraulic brake valve system 300, valve lever 326 may be in an open position (such as lever on position 338), and/or valve shaft 322 may be in an open position (such as shaft on position 334). Actuator 350 may be commanded to release the brake, and therefore may move actuator shaft 354 via the motor (e.g., in a direction opposite of actuation direction 341) such that valve lever 326 moves toward lever off position 336 and/or valve shaft 322 moves toward shaft off position 332. In various embodiments, a spring (not shown) may be coupled to valve actuation end 318 and valve shaft 322, applying force on valve shaft 322 to influence the position of valve shaft 322. The spring may be biased toward shaft off position 332. Therefore, in response to receiving a command to release the brake, actuator 350 may release actuator shaft 354 from its position, and therefore release valve shaft from its on position. In response, the spring coupled to valve shaft 322 may, due to the spring bias toward shaft off position 332, move valve shaft 322 to shaft off position 332, and therefore, move valve lever 326 to lever off position 336. In response to valve shaft 322 reaching shaft off position 332, hydraulic pressure may pass through brake port 312 and be returned from the brake assembly to hydraulic brake valve system 300 through return port 316. Therefore, there may be no brake pressure applied to the wheel in response to valve shaft 322 moving to shaft off position 332.

Figure 6:
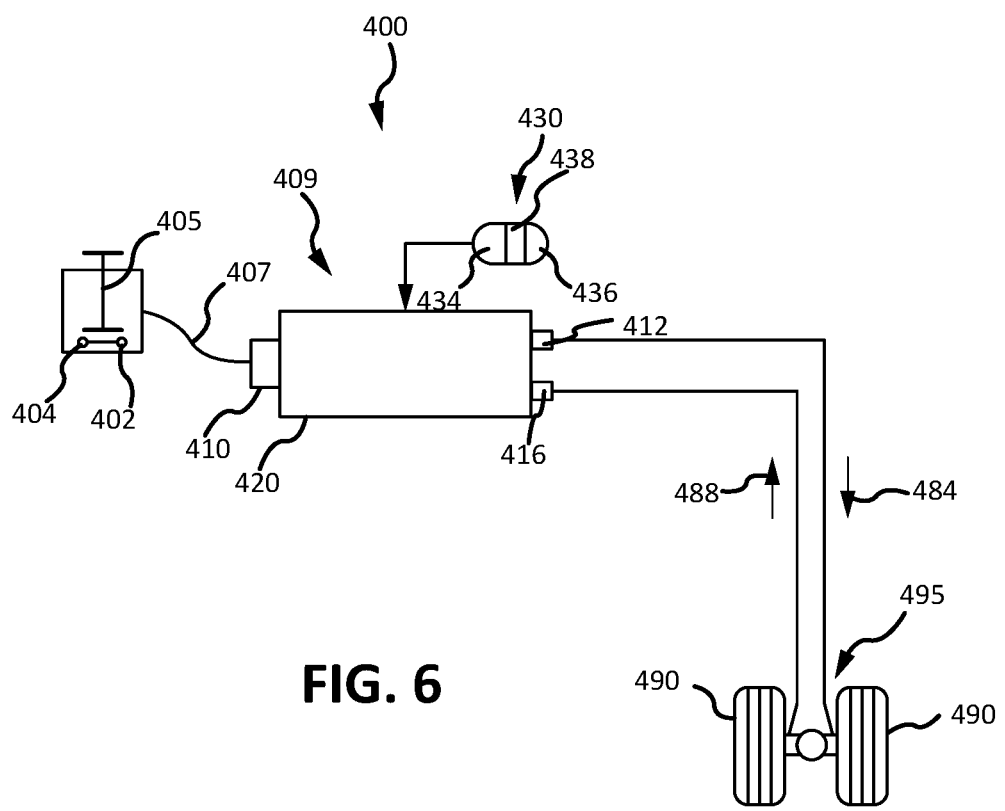
FIG. 6 illustrates a schematic view of an emergency brake system, in accordance with various embodiments.

In various embodiments, actuator 350 may be commanded to move actuator shaft 354 any amount such that valve shaft 322 may be disposed at or anywhere between shaft off position 332 and a shaft on position in which brake port 312 is completely open, and thus applying maximum hydraulic pressure. With reference to FIGS. 3A, 3B, and 6, an emergency brake system 400 may comprise an actuator handle 405, a hydraulic brake valve system 409 (a schematic depiction of a hydraulic brake valve system, for example, hydraulic brake valve system 300 in FIGS. 3A and 3B) including an actuator 410 (a schematic depiction of an actuator, for example, actuator 350 in FIGS. 3A and 3B) and a valve housing 420 comprising a brake port 412 and a return port 416, an accumulator 430, a brake assembly 495 (which may be used for normal braking operation, emergency braking, and/or park braking), and/or a wheel 490. Valve housing 420 may also comprise a pressure port (not shown in FIG. 6). Brake assembly 110 (in FIG. 2) may be an example of brake assembly 495. Brake assembly 495 may comprise at least two brake disks (e.g., interleaved rotors 32 and stators 34, depicted in FIG. 2), which may be pressed by a hydraulically actuated piston (e.g., actuator 30 in FIG. 2) in response to hydraulic pressure applied to brake assembly 495. The hydraulic pressure for the hydraulically actuated piston may be supplied by hydraulic brake valve system 409.

In various embodiments, actuator handle 405 may be used by the operator of emergency brake system 400 or a vehicle comprising system 400 to modulate the pressure applied by brake assembly 495 to wheels 490. The operator may move actuator handle 405 to a handle on position 402 to engage brake assembly 495 against wheels 490, or the operator may move actuator handle 405 toward or to a handle off position 404 to decrease brake pressure or disengage brake assembly 495 from wheels 490. Handle on position 402 may be a maximum on position (applying maximum brake pressure), or anywhere between the maximum on position and handle off position 404. Actuator handle 405 may be in electronic communication via wiring 407 with a processor and/or actuator 410. The processor in communication with actuator 410 may receive braking commands from actuator handle 405.

Actuator handle 405 may be moved to handle on position 402 (i.e., to a maximum handle on position or anywhere between the maximum handle on position and handle off position 404) to provide any desired amount of emergency brake pressure to brake assembly 495. For example, if actuator handle 405 is moved to a handle on position 402 that is halfway between the maximum handle on position and handle off position 404, emergency brake system 400 may apply half of the available hydraulic pressure to brake assembly 495 of what it would applied if actuator handle 405 was moved to the maximum handle on position (for maximum pressure). Actuator handle 405 being in an on position causes a command to be sent via wiring 407 to actuator 410 (a schematic representation of an actuator, for example, actuator 350 depicted in FIGS. 3A and 3B), or a processor in communication with actuator 410, to rotate the electric motor, and move actuator shaft 354 to a position corresponding to the position of actuator handle 405. In response, valve shaft 322 will move to a position corresponding to the position of actuator shaft 354 and/or actuator handle 405, allowing a corresponding amount of hydraulic pressure from brake port 412 (a schematic representation of a brake port, for example, brake port 312 depicted in FIGS. 3A and 3B) to travel in pressure direction 484 to brake assembly 495 to engage the brake (i.e., the emergency brake). In response to actuator handle being moved to handle off position 404, a command may be sent via wiring 407 to actuator 410 (or a processor) to rotate the electric motor and cause actuator shaft 354 to move in a direction opposite actuation direction 341. In response, valve shaft 322 may move to shaft off position 332, closing brake port 312 (412), and opening return port 416 (a schematic representation of a return port, for example, return port 316 depicted in FIGS. 3A and 3B) such that the hydraulic pressure in brake assembly 495 travels in return direction 488 and is returned to hydraulic brake valve system 409 (300), disengaging the brake (i.e., emergency brake).

In various embodiments, actuator 350 (410) may comprise a position lock (e.g., park brake assembly 20 in FIGS. 4 and 5A-5C) which locks actuator shaft 354 in place in response to reaching the position corresponding to the position of actuator handle 405. In operation, actuator 350 (410) may be powered to move actuator shaft 354 and valve shaft 322 to the desired position, and then locking actuator shaft 354 and valve shaft 322 in place using the position lock. Actuator 350 (410) may comprise a position sensor to determine the position of actuator shaft 354, and determine when the desired position has been reached. In response the position lock locking actuator shaft 354 in place, actuator 350 (410) no longer needs to be powered to maintain the position, and therefore, is no longer powered. The hydraulic pressure applied to brake assembly 495 is maintained by maintaining the position of valve shaft 322.

In various embodiments, to release the brake by moving actuator shaft 354 to cause valve shaft 322 to move to shaft off position 332, actuator 350 (410) would be powered again to release the position lock and/or move actuator shaft 354 in a direction opposite of actuation direction 341. Therefore, actuator 350 (410) may further comprise an actuator release 356, which may be used to release the position lock of actuator 350 (410) under circumstances in which electric power is unavailable or unneeded to power actuator 350 (410) to move actuator shaft 354 in a direction opposite of actuation direction 341. Actuator release 356 may be a lever or other device to manually release the position lock, and in response, the spring coupled to valve shaft 322 may move valve shaft to shaft off position 332 because of the spring's bias to do so. Therefore, hydraulic pressure to the brakes may be released without electric power to actuator 350 (410), disengaging brake assembly 495. In various embodiments, actuator release 356 may be a port which may receive a device to provide sufficient power to release the position lock, allowing the biased spring to return valve shaft 322 to shaft off position 332, or the device may provide sufficient power to power the motor of actuator 350 (410) to move actuator shaft 354.

In various embodiments, accumulator 430 may be in fluid communication with hydraulic brake valve system 409 and may comprise a hydraulic pressure chamber 434, a balance pressure chamber 436, and an accumulator piston 438 disposed between hydraulic pressure chamber 434 and balance pressure chamber 436. Accumulator 430 may be configured to store hydraulic pressure for use in response to valve shaft 322 being disposed in an on position (e.g., shaft on position 334), in which case, pressure port 314 would open, allowing the stored hydraulic pressure to travel through brake port 312 (412) in pressure direction 484 to engage brake assembly 495. For example, accumulator 430 may store 3000 psi of hydraulic pressure. Balance pressure chamber 436 may hold pressure provided by another source to balance stored hydraulic pressure in hydraulic pressure chamber 434.

In response to actuator handle 405 being moved to an on position, valve shaft 322 may move to an on position (by actuator 350 moving actuator shaft 354 in actuation direction 341), brake port 312 (412) and/or pressure port 314 may open and be fluidly coupled, and the 3000 psi of stored hydraulic pressure in accumulator 430 may travel through brake port 312 (412) in pressure direction 484 to engage brake assembly 495 (i.e., applying brake pressure). In response to the brake pressure reaching a certain desired value, for example 1500 psi, the stored hydraulic pressure may reach equilibrium with the pressure provided in balance pressure chamber 436, and may close brake port 312 (412) to maintain the 1500 psi applied to brake assembly 495. In this example, 1500 psi applied to brake assembly 495 may correspond to actuator handle 405 and/or valve shaft 322 being disposed in a handle on position 402/shaft on position 334 that is halfway between handle off position 404/shaft off position 334 and a maximum on position. In response to actuator handle 405 and/or valve shaft 322 being moved to a maximum on position, all 3000 psi stored in accumulator 430 may be applied to brake assembly 495. In response to actuator handle 405 being moved toward or into handle off position 404, brake port 312 (412) may be fluidly coupled to return port 316 (416). In response, the hydraulic pressure applied to brake assembly 495 may travel in return direction 488 to release pressure from brake assembly 495. In various embodiments, in response to actuator handle 405 being in handle off position 404 and/or valve shaft 322 being disposed in shaft off position 334, brake port 312 may be fluidly coupled to return port 416 such that any pressure moving through brake port 312 will be returned through return port 316 so no unintentional braking may occur.

In various embodiments, accumulator 430 may comprise a pressure release, similar to actuator release 356. In a case in which the emergency brake should be disengaged without electric power, an operator may actuate (manually, or otherwise) the pressure release on accumulator 430 to release the fluid in balance pressure chamber 436, thus causing the hydraulic pressure in brake assembly 495 to return to accumulator 430 to compensate for the lost pressure from balance pressure chamber 436.

In various embodiments, emergency brake system 400 may be utilized in an emergency (e.g., a rejected take-off, in which an aircraft must rapidly decrease speed) or in response to an aircraft or other vehicle being parked. As an example, a pilot of an aircraft may bring the aircraft to a stop and wish to park the aircraft. Accordingly, with reference to FIGS. 3A, 3B, and 6, the pilot may move actuator handle 405 from handle off position 404 to an on position (e.g., handle on position 402). In response to actuator handle 405 being in an on position, a command may travel to actuator 410 via wiring 407, and as described, actuator may be powered and the components of hydraulic brake valve system 300 (409) may move such that hydraulic pressure travels through brake port 312 (412) in pressure direction 484 to engage brake assembly 495 to maintain the immobility of wheels 490. In response, actuator 350 (410) no longer receives power, and the components of hydraulic brake valve system 300 (409) may remain static to maintain the hydraulic pressure supplied to brake assembly 495.

Emergency brake system 400 allows the pilot to modulate the brake assembly 495 accurately through electronic control of hydraulic brake valve system 300 (409), thus avoiding the vulnerability of a mechanically activated emergency brake to damage which may utilize a cable to transfer the movement from a manual actuator handle or lever to the valve lever, for example. In addition, if the pilot wishes to engage brake assembly 495 partially, the pilot may move actuator handle 405 a desired amount to a handle on position 402 between the maximum handle on position (maximum hydraulic pressure to brake assembly 495) and handle off position 404 to apply brake assembly 495 to wheels 490 with desired stopping force. In various embodiments, the pressure applied to brake assembly 495 as a result of a movement of actuator handle 405 may be displayed to the pilot (e.g., in psi, or percentage of maximum available brake force, or the like). In various embodiments, such a display may be provided by a position sensor in actuator 350 (410) (to detect the position of actuator shaft 354) and/or valve housing (to detect the position of valve shaft 322). Additionally, by incorporating an actuator release (e.g., actuator release 356), emergency brake system 400 may allow easy disengagement of an emergency brake without requiring electric power (which is required in all-electric emergency brake systems).

Figure 7:
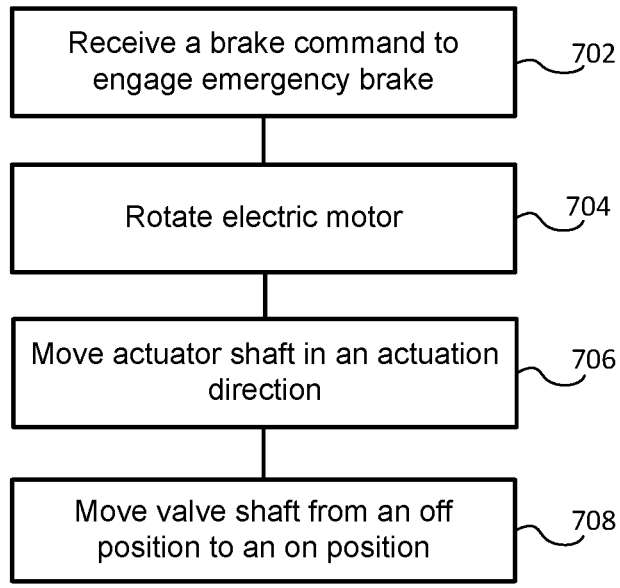
FIG. 7 illustrates a method for actuating an emergency brake, in accordance with various embodiments.

Referring to FIG. 7, a method 700 for actuating an emergency brake is depicted, in accordance with various embodiments. With combined reference to FIGS. 3A, 3B, 6, and 7, a vehicle operator (e.g., an aircraft pilot) may move actuator handle 405 from handle off position 404 to an on position (e.g., handle on position 402). In response, a command to engage the emergency brake may be transmitted via wiring 407 to actuator 410 (350) and/or a processor, and actuator 410 (350) and/or the processor may receive the command to engage the emergency brake (step 702). In response, power may be provided to actuator 410 (350). The motor within actuator 410 (350) may rotate (step 704), and in response, move actuator shaft 354 in actuation direction 341 (step 706). In various embodiments, in response, valve shaft 322 may move from shaft off position 332 to an on position (e.g., shaft on position 334) (step 708), which may be a maximum on position or anywhere between a maximum on position and shaft off position 332. In various embodiments, in which hydraulic brake valve system 300 comprises valve lever 326 coupled between actuator shaft 354 and valve shaft 322, valve lever 326 may move in actuation direction 341 in response to the actuator shaft 354 movement. In response, valve shaft 322 may move from shaft off position 332 to an on position (e.g., shaft on position 334) (step 708). Such movement of valve shaft 322 to an on position (e.g., shaft on position 334) may open brake port 312 (412) and cause hydraulic pressure stored in accumulator 430 to travel through brake port 312 (412) in pressure direction 484 to brake assembly 495, engaging brake assembly 495 (i.e., the emergency brake). No electric power may be supplied to actuator 410 (350) after valve shaft 322 has reached the desired on position.

Figure 8:
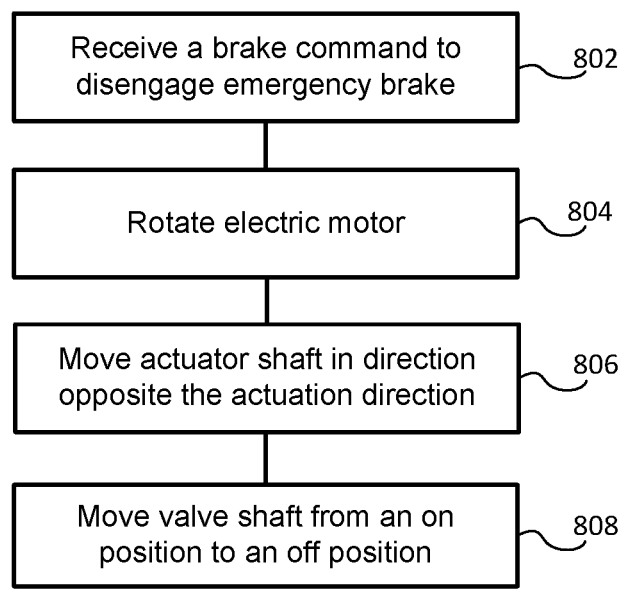
FIG. 8 illustrates a method for disengaging an emergency brake, in accordance with various embodiments.

Referring to FIG. 8, a method 800 for disengaging an emergency brake is depicted, in accordance with various embodiments. With combined reference to FIGS. 3A, 3B, 6, and 8, a vehicle operator (e.g., an aircraft pilot) may move actuator handle 405 from an on position (e.g., handle on position 402) to handle off position 404. In response, a command to disengage the emergency brake may be transmitted via wiring 407 to actuator 410 (350) and/or a processor, and actuator 410 (350) and/or the processor may receive the command to disengage the emergency brake (step 802). In response, power may be provided to actuator 410 (350). The motor within actuator 410 (350) may rotate (step 804), and in response, move actuator shaft 354 in a direction opposite actuation direction 341 (step 806). In various embodiments, in response, valve shaft 322 may move from an on position (e.g., shaft on position 334) to shaft off position 332 (step 808). In various embodiments, in which hydraulic brake valve system 300 comprises valve lever 326 coupled between actuator shaft 354 and valve shaft 322, valve lever 326 may move in a direction opposite actuation direction 341 in response to the actuator shaft 354 movement. In response, valve shaft 322 may move from an on position (e.g., shaft on position 334) to shaft off position 332 (step 808). Such movement of valve shaft 322 to shaft off position 332 may cause the hydraulic pressure applied to brake assembly 495 to leave brake assembly 495 and travel in return direction 488 through return port 316 (416), disengaging brake assembly 495 (i.e., the emergency brake).

In various embodiments, the command received to disengage the emergency brake (step 802) may be to decrease the hydraulic pressure to brake assembly 495. Such a command would result from the movement of actuator handle 405 to a handle on position 402 closer to handle off position 404 than the previous position of actuator handle 405. In response, valve shaft 322 may move in a direction opposite actuation direction 341 (step 806) to an on position closer to shaft off position 332. Such movement of valve shaft 322 may cause a portion of the hydraulic pressure applied to brake assembly 495 to leave brake assembly 495 and travel in return direction 488 through return port 316 (416), decreasing the hydraulic pressure applied to brake assembly 495.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A hydraulic brake valve system, comprising:
  a valve housing comprising a brake port, a pressure port, a return port, and a valve actuation end;
  a valve shaft coupled to the valve actuation end, wherein the valve shaft is comprised at least partially within the valve housing; and an electric actuator coupled to the valve shaft, wherein the electric actuator is configured to move the valve shaft between a shaft on position and a shaft off position, wherein the hydraulic brake valve system is configured to pass hydraulic pressure through at least one of the brake port, the pressure port, or the return port in response to a position of the valve shaft.

2. The hydraulic brake valve system of claim 1, further comprising a valve lever coupled to the valve housing at a fulcrum and coupled to the electric actuator, wherein the valve lever is rotated about the fulcrum by the electric actuator, wherein the valve shaft is coupled to the valve lever, and the valve shaft moves in response the valve lever rotating about the fulcrum.

3. The hydraulic brake valve system of claim 2, further comprising a lever base coupled to the valve housing, wherein the valve lever is coupled to the lever base.

4. The hydraulic brake valve system of claim 1, wherein the electric actuator comprises an actuator shaft coupled to a motor, wherein operation of the motor causes the actuator shaft to move.

5. The hydraulic brake valve system of claim 4, further comprising a spring coupled to the valve shaft, the spring having a bias toward returning the valve shaft to the shaft off position.

6. The hydraulic brake valve system of claim 5, wherein the electric actuator comprises an actuator release configured to release the valve shaft from the shaft on position to allow the spring to return the valve shaft to the shaft off position.

7. The hydraulic brake valve system of claim 4, wherein the actuator shaft moves at least one of linearly or rotationally in response to operation of the motor.

8. The hydraulic brake valve system of claim 1, wherein the hydraulic brake valve system is configured to pass hydraulic pressure through the brake port in response to the valve shaft being in the shaft on position.

9. The hydraulic brake valve system of claim 1, wherein the hydraulic brake valve system is configured to pass the hydraulic pressure through the return port in response to the valve shaft being in the shaft off position.

10. An emergency brake system comprising:
a brake assembly comprising at least two brake disks;
a hydraulically actuated piston to compress the at least two brake disks in response to an actuation of the emergency brake system; and
a hydraulic brake valve system fluidly coupled to the hydraulically actuated piston comprising:
a valve housing comprising a brake port, a pressure port, a return port, and a valve actuation end;
a valve shaft coupled to the valve actuation end, wherein the valve shaft is comprised at least partially within the valve housing; and
an electric actuator coupled to the valve shaft, wherein the electric actuator is configured to move the valve shaft between a shaft on position and a shaft off position,
wherein the hydraulic brake valve system is configured to pass hydraulic pressure through at least one of the brake port, the pressure port, or the return port in response to a position of the valve shaft.

11. The emergency brake system of claim 10, wherein the hydraulic brake valve system further comprises a valve lever coupled to the valve housing at a fulcrum and coupled to the electric actuator, wherein the valve lever is rotated about the fulcrum by the electric actuator, wherein the valve shaft is coupled to the valve lever, and the valve shaft is configured to move in response the valve lever rotating about the fulcrum.

12. The emergency brake system of claim 11, wherein the hydraulic brake valve system further comprises a lever base coupled to the valve housing, wherein the valve lever is coupled to the lever base.

13. The emergency brake system of claim 10, wherein the electric actuator comprises an actuator shaft coupled to an actuator motor, wherein operation of the motor causes the actuator shaft to move.

14. The emergency brake system of claim 13, wherein the hydraulic brake valve system further comprises a spring coupled to the valve shaft, the spring having a bias toward returning the valve shaft to a shaft off position.

15. The emergency brake system of claim 14, wherein the electric actuator comprises an actuator release configured to release the valve shaft from the shaft on position to allow the spring to return the valve shaft to the shaft off position.

16. The emergency brake system of claim 13, wherein the actuator shaft moves at least one of linearly or rotationally in response to operation of the motor.

17. The emergency brake system of claim 13, wherein the hydraulic brake valve system further comprises an actuator handle in electronic communication with the electric actuator, wherein the motor operates in response to the actuator handle being moved.

18. The emergency brake system of claim 10, wherein the hydraulic brake valve system is configured to pass the hydraulic pressure through the brake port in response to the valve shaft being in the shaft on position.

19. A method of operating an emergency brake system, comprising:
receiving a braking command to engage a brake assembly of the emergency brake system in response to an operator moving an actuator handle from a handle off position to a handle on position, wherein the actuator handle is in electronic communication with an electric actuator comprising an electric motor and an actuator shaft coupled to the electric motor;
rotating the electric motor in response to the moving of the actuator handle to the handle on position;
moving the actuator shaft in an actuation direction in response to rotating the electric motor, wherein the actuator shaft is coupled to a valve shaft of a hydraulic brake valve system;
moving the valve shaft from a shaft off position to a shaft on position, causing hydraulic pressure to flow from a brake port of the hydraulic brake valve system to compress at least two brake disks; and
engaging the brake assembly.

20. The method of claim 19, further comprising:
receiving a second braking command to disengage the brake assembly in response to the actuator handle moving from the handle on position to the handle off position;
rotating the electric motor in response to the moving the actuator handle to the handle off position;
moving the actuator shaft in a direction opposite the actuation direction in response to rotating the electric motor;
moving the valve shaft from the shaft on position to the shaft off position; and
disengaging the brake assembly.

* * * * *